United States Patent [19]
Barrett, Jr. et al.

[11] 3,745,578
[45] July 10, 1973

[54] MULTIPLE FREQUENCY RADAR SYSTEM HAVING IMPROVED RESPONSE TO SMALL TARGETS

[75] Inventors: Carl R. Barrett, Jr.; James E. Feeney, both of Anaheim; Abe Goldstein, Santa Ana; Raymond F. Racine, Orange, all of Calif.

[73] Assignee: North American Rockwell Corporation, El Segundo, Calif.

[22] Filed: Aug. 2, 1965

[21] Appl. No.: 476,630

[52] U.S. Cl. .......................................... 343/17.2 R
[51] Int. Cl. .............................................. G01s 9/02
[58] Field of Search ................ 343/5, 7, 14, 17.2, 343/17.5

[56] References Cited
UNITED STATES PATENTS
3,168,735 2/1965 Cartwright.................... 343/17.5 X

*Primary Examiner*—Malcolm F. Hubler
*Attorney*—William R. Lane, L. Lee Humphries and Rolf M. Pitts

[57] ABSTRACT

A multiple frequency radar technique for enhancing the response of the radar to discrete targets relative to a clutter background containing such targets. A bandpass limited, closed-loop single side band modulator, responsive to a RF source and IF source, generates a plurality of mutually-coherent RF frequencies for pulsed transmission, and a non-linear detector having an output coupled to an IF stage (tuned to the frequency of the IF source) responds to the beat frequency difference between the multiple frequency of received echoes of the transmitted energy.

17 Claims, 7 Drawing Figures

MULTIPLE FREQUENCY RADAR SYSTEM HAVING IMPROVED RESPONSE TO SMALL TARGETS

BACKGROUND OF THE INVENTION

It has been discovered that the signal-to-clutter ratio for small targets (e.g., targets having a transverse extent less than the antenna beamwidth, and presenting a radial extent less than that represented by the transmitted pulsewidth) may be substantially and significantly enhanced by the pulsed transmission of a plurality of discrete carrier frequencies, representing a plurality of successively increased frequencies, the frequency difference between successive frequencies being not less than that bandwidth corresponding to the reciprocal of the transmitted pulsewidth; and then combining the echoes thereof received from a given target direction and range. A discussion of this technique is more fully discussed in copending U. S. application Ser. No. 430,141 for a Radar System Having Improved Response to Small Targets, filed Feb. 3, 1965, now U.S. Pat. No. 3,500,404, by James O. Anderson et al., assignors to North American Aviation, Inc., assignee of the subject invention.

By means of the above-described technique those components of the received echoes from a small target tend to correlate or cumulatively combine to provide an enhanced signal indicative of the presence of such small target; while the components of the received echoes from a clutter background in the vicinity of the target tend to mutually decorrelate (1) over the duration of the pulsewidth echo for each discrete frequency and (2) as between the received echoes of two discrete frequencies, as to provide an attenuated clutter return.

While the above-referenced patent application describes several means for implementing such technique, the several embodiments disclosed and illustrated therein employ a separate frequency source for each of the discrete frequencies to be concomitantly transmitted, thereby increasing the cost and weight associated with such implementation. Further, where separate frequency sources are employed for the discrete frequencies to be pulsed concomitantly, it is difficult to initially mutually phase-synchronize such frequencies at the beginning of each pulse. In other words, where a selected initial phase relationship is not maintained between all of the discrete frequencies at the beginning of each pulsewidth, then the enhancement of the small target-to-clutter ratio is less effective. Moreover, such embodiments do not readily lend themselves to precisely maintaining a uniform frequency spacing between the discrete frequencies concomitantly transmitted, whereby a single, high-gain, low-noise IF receiver-amplifier channel may be conveniently employed for signal transport of all such received descrete frequencies concomitantly.

By means of the concept of the subject invention, the above-described limitations are overcome in implementing a multiple-frequency radar for discrete target enhancement; and only a single modulating frequency source is used in closed loop cooperation with a radio frequency source to provide the concomitantly transmitted discrete frequencies of uniform frequency-spacing and having a selected mutual phase-relation.

In a preferred embodiment of the concept of the invention, there is provided a pulsed transmitter comprising closed-loop radio frequency single side band modulation means responsively coupled to a source of radio frequency energy and to a source of a modulating or spacing frequency greater than that represented by the reciprocal of the pulsewidth and corresponding to an integer submultiple of a preselected intermediate frequency. A magic tee is interposed between the radio frequency source and the associated input to the single side band modulating means and a single side band output of the single side band modulating means is coupled to an input of the magic tee as a feedback signal, such feedback arrangement comprising a multiple-frequency generating loop. An output of the multiple frequency generating loop is applied to a pulse modulator amplifier stage for pulsed transmission purposes.

In normal operation of the above described closed loop side band modulation arrangement, the feedback of a single side band frequency, when modulated by the modulation frequency, provides a successively higher single side band component frequency, whereby a plurality of concomitant mutually coherent discrete frequencies, uniformly spaced apart in frequency, is generated. The output frequencies of the single side band modulation means correspond to the frequency of the RF source modulated by the injected modulation frequency, the number, $n$, of frequencies being limited by the bandwidth $(n-1)f_m$ of the closed loop path, and the uniform frequency-spacing being equal to the modulating frequency, $f_m$. The receiver mixer processor reduces the received multiple frequencies to multiples of the modulating frequency, whereby like or common beat frequencies of the received multiple frequency echoes may beat together. In this way, the mutually in-phase components of the beat frequency signals produced by a small or discrete target tend to be sustained, while the random-phase components due to clutter tend to be mutually cancelling or at least greatly attenuated. Hence, a tuned intermediate frequency amplifier stage having a tuned frequency at the modulating, or spacing frequency, provides an enhanced response to small or discrete targets in the presence of clutter.

By means of such arrangement, the necessity of a large number of discrete frequency generators is avoided, the desired number of discrete frequencies being achieved by preselectively limiting the gain and bandwidth of the feedback signals to the single side band modulating means. Also, because the plurality of discrete frequencies are related as successive single side band harmoics of the injection frequency modulating the radio frequency source, a periodic cophasal relation exists among such signals as to provide an improvement in the enhanced target-to-clutter ratio in the received echoes of the transmitted spectra. In other words, a coherent or periodic cophasal relation synchronously occurs among the common beat frequencies or uniform frequency differences between all of the discrete frequencies of the received echoes, as to enhance the target-to-clutter signal ratio. Further, because the modulating frequency $f_m$ determines such uniform frequency spacing and beat frequencies, the second single side band output of the upper and lower side band outputs of the single side band modulation means may, if desired, be used as a local oscillator input to a receiver-mixer to reduce the received echoes to a combined signal at a single intermediate frequency, representing an integer multiple of the modulating frequency. In this way a single low-noise, high-gain tuned IF amplifier channel may be employed to suitably amplify the received signals for use by signal utilization means. In other words, a wide bandwidth transmitted RF signal may be processed by a narrow bandwidth IF receiver-amplifier. Moreover, the system performance in a given clutter environment may be conveniently adjusted by simply adjusting the modulating frequency $f_m$ and feedback bandwidth, thereby adjusting the uniform frequency spacing and number of spaced frequencies. Accordingly, it is a broad object of the invention to provide an improved radar system having an enhanced target-to-clutter response ratio.

It is another object of the subject invention to provide multiple frequency radar means having enhanced target-to-clutter response ratio.

It is still another object of the invention to provide a multiple frequency radar system employing a single radio frequency source.

It is a further object of the invention to provide a multiple frequency radar system adapted to utilizing a common single IF channel for processing the received signals.

It is still a further object of the invention to provide a radar system having discrete target enhancement properties and which is efficient and economical to fabricate.

It is yet a further object of the invention to provide a discrete-target enhancement radar system which may be conveniently adjusted for optimum performance within a given target-and-clutter environment.

These and further objects of the invention may be appreciated from the following description, taken together with the accompanying drawings in which.

In the figures, like reference characters refer to like parts.

Figure 1:
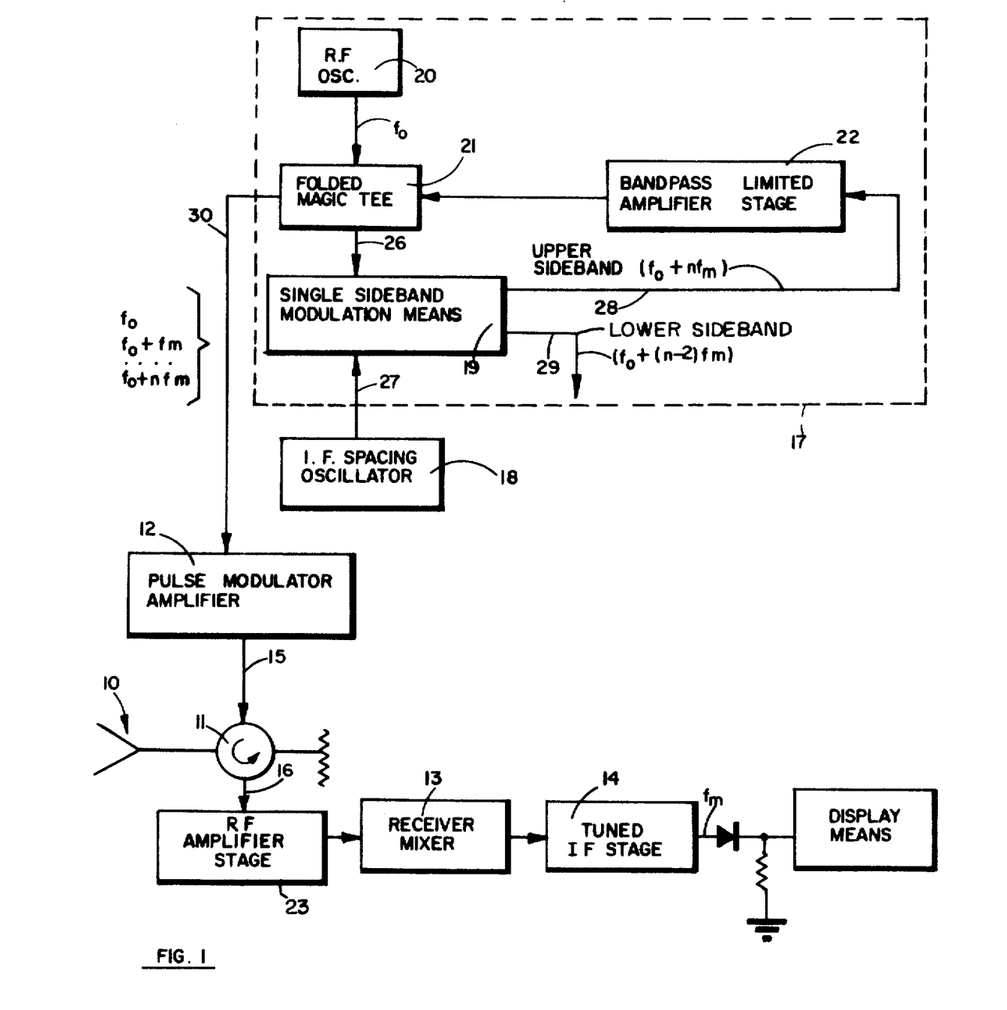
FIG. 1 is a block diagram of a system embodying the concept of the invention.

Referring now to FIG. 1, there is illustrated in block diagram form a radar system embodying the concept of the invention. There is provided an antenna 10 in cooperation with transmit-receive means 11, such as a ferrite circulator. A source of pulsed radio frequency energy comprising a pulse modulator 12, is coupled to a transmit terminal 15 of circulator 11; and an intermediate frequency receiver comprises a mixer 13 having an output coupled to the input of a tuned intermediate frequency amplifier 14 and further having an input coupled to a receiver terminal 16 of circulator 11. The construction and arrangement of elements 10, 11, 12, 13 and 14 are well understood in the art. Therefore, these elements are shown in FIG. 1 in block form only for convenience in exposition.

There is further provided closed loop radio frequency single side band modulation means 17 in cooperation with a spacing frequency oscillator 18 for generating a concomitant plurality of mutually coherent frequencies uniformly spaced apart in frequency by the frequency of oscillator 18. Such spacing frequency, provided by oscillator 18, is selected as being more than that represented by the reciprocal of the system pulsewidth provided by modulator 12, and represents an integer submultiple of the tuned IF center frequency of IF receiver-amplifier 14, for reasons which will be more fully explained hereinafter.

Closed loop single side band modulation means 17 comprises a radio frequency single side band modulator 19 having one input 26 responsively connected to a source 20 of radio frequency energy, and further having a second input 27 coupled to the output of modulating frequency source 18, for providing one of an upper and lower side band signal at a first output 28 thereof, and may provide a corresponding second side band signal at a second output 29. Magic tee 21, or like signal combining means, is provided for combining one of the single side band output signals as a feedback signal with the radio frequency input 26 to modulator 19, a second output terminal 30 of magic tee 21 extracting such single side band signal as a radio frequency input to pulse modulator 12. Alternatively, the other of the single side band output signals may be fed to pulse modulator 12. Also included in the feedback arrangement of modulator 19 is a bandpass limited amplifier stage 22 for the purpose of limiting the spectral content of the modulation envelopes of the single side band outputs of modulator 19 to a selected number of frequencies, spaced apart by the spacing frequency, $f_m$, provided by oscillator 18.

Figures 2, 2B, 2C:
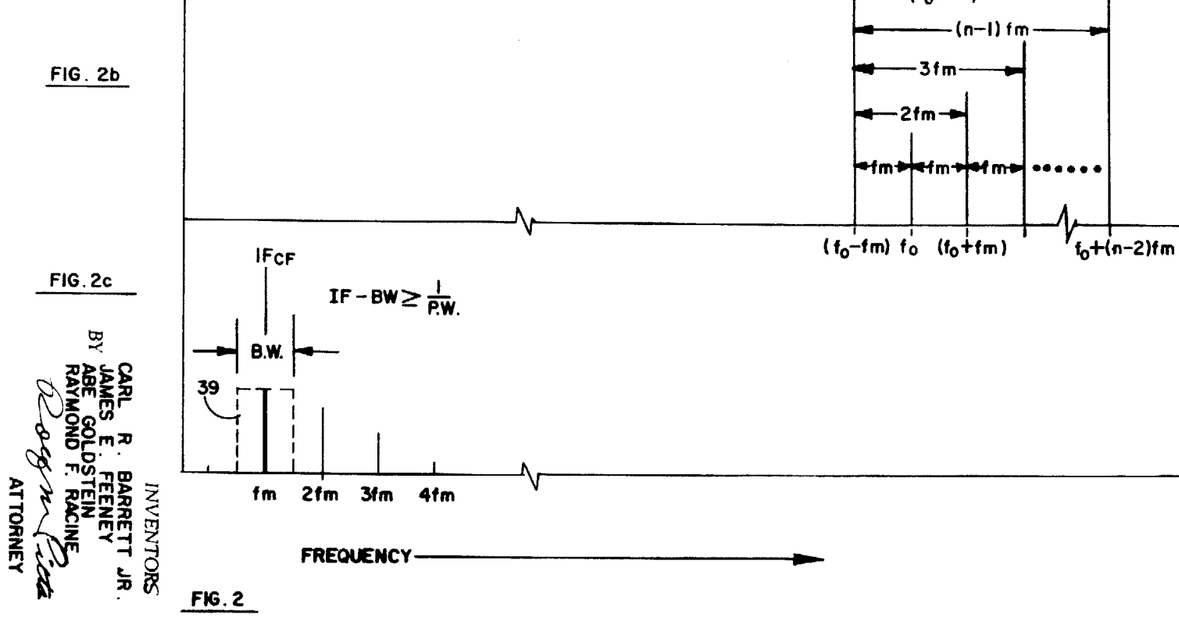
FIG. 2a, 2b and 2c is a family of spectral diagrams, illustrating the frequency responses of several elements of the device of FIG. 1.

In normal operation of the arrangement of the closed loop arrangement of single side band modulator of FIG. 1, one set of side bands is used to provid a multiple frequency coherent transmission source; and the other set may be used to provide a local oscillator signal for each of the transmitted frequencies, as to eliminate the need for either a separate local oscillator or automatic frequency control, as may be more fully appreciated from FIG. 2.

Figure 2A:
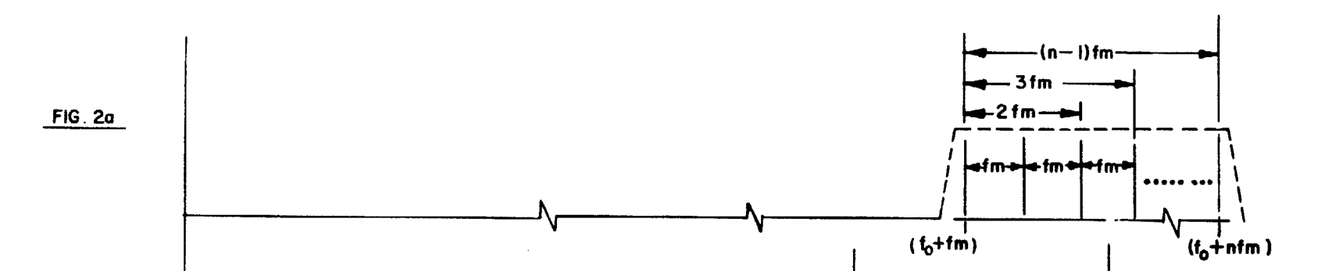

Referring to FIG. 2, there is illustrated a family of spectral diagrams, illustrating the frequency response of several elements of the device of FIG. 1. FIGS. 2a and 2b are diagrams of the respective spectral content of a representative upper side band signal occurring at output line 28 of single side band modulator 19 and a lower side band output at line 29 thereof; and FIG. 2c is a diagram of the spectral content of the output of receiver mixer 13.

The mixing of the modulation frequency $f_m$ (from spacing oscillator 18 of FIG. 1) with the radio frequency $f_o$ (from RF source 20 of FIG. 1) produces a first upper side band component $(f_o + f_m)$, at output terminal 29 (in FIG. 1). The feedback of one of the single side band outputs to the RF input of modulation means 19 produces a subsequent modulation of such first component signal by the modulating frequency from spacing oscillator 18, resulting in an additional component frequency in the single side band output, such additional component differing in frequency from the first component by the amount of the spacing frequency, $f_m$. The result of such feedback cooperation is a plurality of concomitant discrete frequencies, uniformly spaced apart in frequency by the spacing frequency, $f_m$, the number, $n$, of such component frequencies of the single side band output being limited by the bandwidth $(n - 1) f_m$ of the feedback amplifier stage 22 (of FIG. 1), which bandwidth is indicated as curve 38 in FIG. 2.

For example, where the upper side band is employed as the feedback signal, the first component output frequency is $(f_o + f_m)$. The feedback of such component frequency, and the modulation thereof by spacing frequency $f_m$, produces a second upper side band component frequency $(f_o + 2f_m)$ and a lower side band component, $f_o$. The feedback and modulation of such successive frequency produces successively higher frequencies, all spaced apart in frequency by the modulating frequency, $f_m$. A bandpass limited feedback amplifier 22 (in FIG. 1) having a bandwidth of at least $(n - 1)f_m$, the lower bandpass limit of which includes the first or lowest component sideband frequency, $(f_o + f_m)$, as represented by curve 38 of FIG. 2, is thus seen to limit the number of concomitant discrete frequencies so generated to the number n. Moreover, because the plurality of discrete input radio frequencies to modulator 19 are synchronously modulated by a single common modulating signal of frequency $f_m$, the resulting concomitant discrete output frequencies are mutually coherent or cyclically cophasal, as shown more particularly in FIG. 3.

Figure 3:
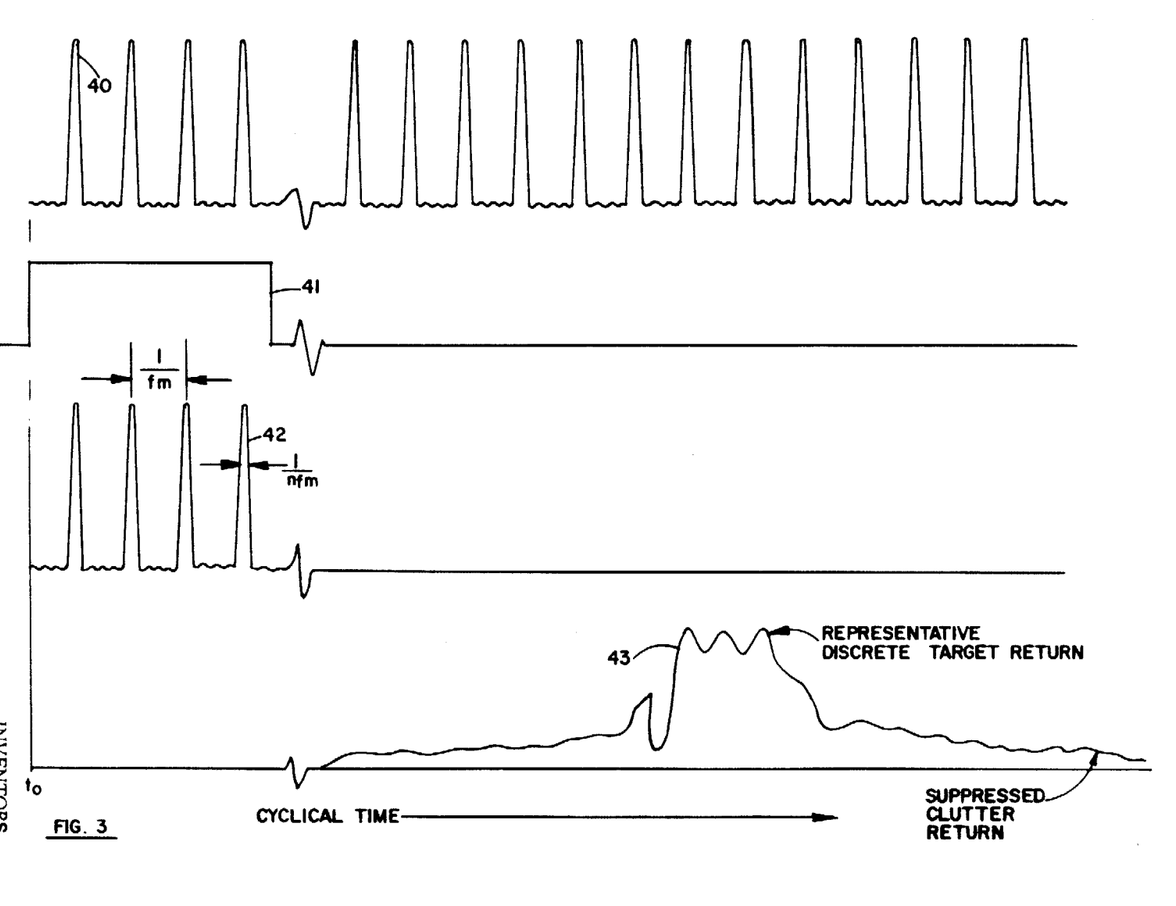
FIG. 3 is a family of time histories of the responses of several elements of FIG. 1, illustrating the enhanced target-to-clutter response ratio resulting from the practice of the invention.

Referring to FIG. 3, there is illustrated a family of time histories of the system of FIG. 1. Curve 40 is a representative history of the output on line 30 of closed loop multiple frequency generator 17, which is fed as an input to the pulse modulator 12 of FIG. 1; curve 41 is a representative time history of the pulsewidth or pulse modulation envelope cyclically generated by pulse modulator 12 at the system pulse repetition rate; curve 42 represents the pulsewidth modulated output from modulator 12 which is transmitted by antenna 10 (of FIG. 1); and curve 43 represents the time history of a representative video detected response of receiver 14 to a discrete target in the presence of clutter.

Curve 40 indicates the periodic cophasal relationship or periodic cumulative amplitude effect of the mutually-coherent, multiple-frequency output generated by generator 17, while curve 42 indicates the modulation of curve 40 by curve 41. The envelope of the transmitted multiple frequency energy shown in curve 42 of FIG. 3, is seen to differ from that of a pulse-width modulated single frequency source in that the envelope of curve 42 substantially represents a pulsewidth train, or succession, of extremely short impulses, rather than a fixed magnitude envelope (such as, for example, curve 41 in FIG. 3). Such periodic impulses occur within the pulsewidth interval at a repetition interval equal to the reciprocal of the spacing frequency, $f_m$, due to the mutual coherence of the multiple frequencies transmitted.

The received echoes of the transmitted multiple frequencies, reflected from a radar target, are beat together or mixed in receiver-mixer 13 of FIG. 1, resulting in a plurality of beat frequencies at integer multiples of the uniform spacing frequency, $f_m$, the corresponding beat frequency spectral content and representative time domain history of which are respectively shown in FIG. 2b and as curve 43 in FIG. 3. Receiver-mixer 13 may be comprised of a diode mixer or square-law detector, comprising a terminal straight wave-guide section, across the narrow dimension of which a diode is inserted, and having a probe for extracting the detected mixed signals for further bandpass limited processing by IF receiver 14. The construction and arrangement of such mixers are well known in the art, as indicated, for example, at pages 385–387 of "Introduction to Radar System" by Skolnik, published by McGraw-Hill, 1962. The center frequency of IF amplifier 14 is made equal to a selected one of the beat frequencies, corresponding to an integer multiple of the spacing frequency $f_m$, and has a bandwidth preferrable no larger than that represented by the reciprocal of the transmitted pulsewidth, indicated by curve 39 of FIG. 3, so as to optimize the signal-to-noise response thereof.

Because the echoes produced by a small or discrete target will tend to preserve the coherence between the transmitted multiple frequencies, like beat frequencies between such discrete, transmitted frequencies, produced in mixer 13, will tend to be coherent, resulting in a cumulative amplitude envelope. On the other hand, return echoes received from a clutter patch of extended radial and angular extent will demonstrate a somewhat random appearing phase relationship between returns of like frequency occurring within a pulsewidth interval, and as between different ones of the transmitted frequencies, whereby the amplitude envelope of the beat frequency components due to the ground clutter tend to be suppressed. Such enhanced discrete target indication of, and suppressed clutter return for, a representative target in clutter situation is shown as curve 43 in FIG. 3. The representative envelope shape of the small target return, shown by curve 43, only somewhat resembles the shape of the idealized transmitted waveform due to the receiver bandwidth limitation, which serves as an integrator or time-lag element. Such bandwidth limitation may be appreciated from the fact that the bandwidth of the receiver (curve 39 in FIG. 2) being limited to the reciprocal of the transmitted pulsewidth (curve 41 of FIG. 3), is much less than the bandwidth indicated by the reciprocal of the impulse width for each impulse of the train of transmitted inpulses (curve 42 in FIG. 3).

Where the received echoes of the transmitted energy are too weak to beat together and provide useful beat frequencies, a broadband RF amplifier stage 23 comprising a traveling wave tube or tunnel diode amplifier may be interposed between the receive output terminal 16 of circulator 11 and the input to mixer 13. Alternatively, a local oscillator input of mixer 13' may be coupled to a single side band output of frequency generator 17 for super-heterodyning purposes, thereby obviating the need for RF stage 23, as shown more particularly in FIG. 4.

Figure 4:
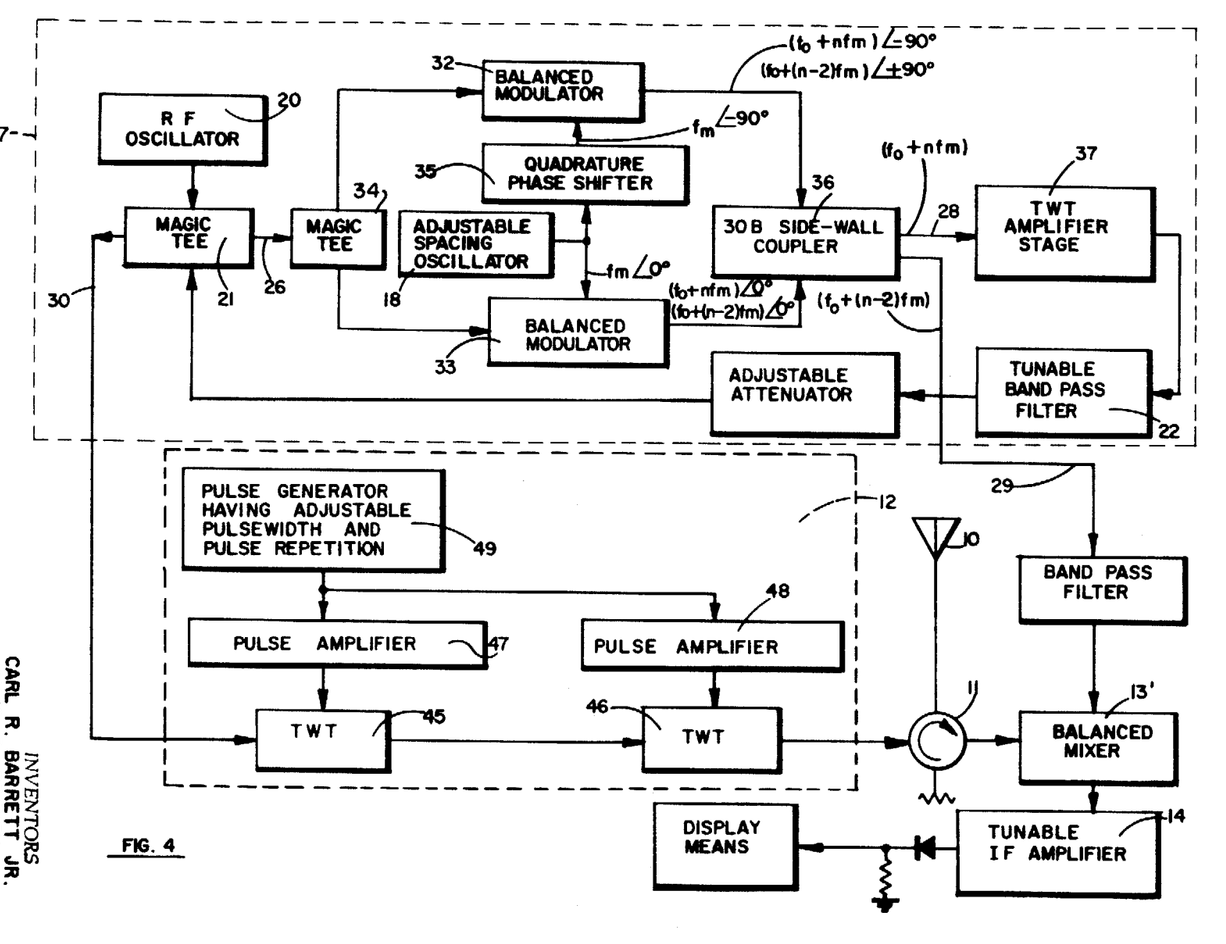
FIG. 4 is a detailed block diagram of one embodiment of the device of FIG. 1.

Referring to FIG. 4, there is illustrated in block diagram form an alternate embodiment of the system of FIG. 1, and in which the coherent multiple frequency generator is shown in more detail. There is provided antenna 10, circulator 11, pulse modulator 12, tuned IF stage 14, multiple frequency generator 17, and spacing oscillator 18, all constructed and arranged to cooperate substantially the same as like referenced elements of FIG. 1. Mixer 13' is comprised of a balanced mixer or RF balanced modulator having a second or local oscillator input thereof responsively coupled to a single side band output of the multiple frequency generator.

The multiple frequency generator 17 of FIG. 4 comprises radio frequency single side band modulation means having a first input 26 coupled to an RF source 20 through RF signal combining means 21, a second input 27 coupled to spacing oscillator 18, and a first output 28 feedback-coupled thereto through bandpass means 22 and signal combining means 21, similarly as the like reference elements of FIG. 1. The radio frequency single side band means of FIG. 4 comprises first and second balanced modulators 32 and 33, and radio frequency power splitting means 34 such as a magic tee coupling a first input of each of modulators 32 and 33 to an output of magic tee 21, a second input of each of modulators 32 and 33 being responsively coupled to the output of modulating frequency source 18. A quarter-wavelength or quadrature phase shifter 35 is interposed between the output of modulating frequency source 18 and the second input to balanced modulator 32; and a 3-decibel microwave sidewall coupler 36, having a first and second input connected to a respective output of first and second modulators 32 and 33, provides an upper side band signal at a first output 28 thereof and a lower side band signal at a second output 29 thereof.

In normal operation of the multiple frequency generator of FIG. 4, the quarter wavelength phase shift provided by phase shifter 35, plus the additional quarter wavelength phase shift provided by coupler 36 produces the 180° or anti-phase relationship required for separation of the upper and lower side bands, the upper side band appearing (for example) at output terminal 28 and the lower side band appearing at output terminal 29. The upper side band signal is amplified by a travelling wave tube 37 prior to being bandpass limited for feedback purposes.

The bandpass limited signal is also extracted (from magic tee 21) for transmission purposes, similarly as in the arrangement of FIG. 1. The pulse modulator 12 in FIG. 4 may be comprised of two travelling wave tubes 45 and 46 connected in tandem, the RF output of one providing the RF input to the other, the pulse modulation input of each being connected to a respective one of first and second pulse amplifiers 47 and 48 which, in turn, are commonly responsive to a pulse signal source 49.

In a preferred embodiment of the above described invention, superior results have been obtained with an RF frequency $f_o$ in the X-band region (8.3 – 9.4 kilomegacycles per second), a pulsewidth of 1 microsecond, a spacing frequency $f_m$ of 10 megacycles per second, and a total multiple frequency bandwidth of $(n-1)f_m$ representing $n = 100$ mutually-coherent RF frequencies $(f_o + nf_m)$.

Where the optimum transmitted waveform for a selected type of discrete target in clutter appears to vary with the type of target, it may be desirable to employ tunable or adjustable elements in certain portions of the system. For example, the bandpass limiter may be made tunable to adjust or limit the number of frequencies transmitted, the frequency of spacing oscillator 18 may be adjustable in order to vary the frequency spacing between the transmitted frequencies. In addition, the pulsewidth, power level and pulse repetition rate of the transmitted energy may be made adjustable, if desired.

Hence, it is to be appreciated that coherent multiple frequency transmission means has been described which allows enhanced receiver response to discrete radar targets relative to a clutter background. Because of the mutually coherent relationship between all of the uniformly frequency-spaced transmitted frequencies, a simple, yet highly effective receiver technique may be employed in cooperation therewith to provide such enhanced target-to-clutter response.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a radar system including a radio frequency source, transmit-receive means in cooperation with an antenna, a transmitter pulse modulator having an output coupled to a transmit terminal of the transmit-receive means, a radio frequency receiver mixer having an input coupled to a receive terminal of said transmit-receive means, the combination comprising:

A spacing frequency oscillator for providing a frequency equal to an integer submultiple of the IF frequency of said receiver, and A radio-frequency single side band modulator having one input coupled to said radio frequency source a second input coupled to said spacing frequency oscillator for providing an upper side band output and a lower side band output, one of said outputs being combined with said radio frequency input thereto, and one of said side band outputs being coupled as an input to said pulse modulator for comprising a multiple frequency generating loop.

2. The device of claim 1 in which there is further provided noncoherent receiving means comprising A receiver mixer having an input responsive to said received echoes for providing intermediate frequency receiver signals; and Tuned intermediate frequency signal translating means having a band-pass substantially equal to the reciprocal of said transmitted pulsewidth and further having a center frequency equal to an integer multiple of said modulating frequency.

3. The device of claim 1 in which there is further provided noncoherent receiving means comprising A receiver mixer having a first input responsive to said received echoes and a local oscillator input responsive to the other of said upper and lower side band signals for providing intermediate frequency receiver signals; and Tuned intermediate frequency signal translating means having a bandpass at least as large as the reciprocal of said transmitted pulsewidth and a center frequency equal to an integer multiple greater than one of said modulating frequency.

4. In a pulsed radar system including a radio frequency source, transmit-receive means in cooperation with an antenna, a transmitter pulse modulator having an output coupled to a transmit terminal of the transmit receive means, a radio frequency receiver mixer having an input coupled to the receive terminal of said transmit-receive means, and an intermediate frequency receiver coupled to said mixer, the combination comprising:

A spacing frequency oscillator for providing a frequency equal to an integer submultiple of the IF frequency of said receiver, and a Closed loop radio-frequency single side band modulator having one input coupled to said radio frequency source a second input coupled to said spacing frequency oscillator for providing a single side band output, said output being both combined with said radio frequency input thereto and coupled as an input to said pulsed modulator.

5. In a pulsed radar system including a radio frequency source, transmit-receive means in cooperation with an antenna, a transmitter pulse modulator having an output coupled to a transmit terminal of the transmit-receive means, a radio frequency receiver mixer having an input coupled to the receive terminal of said transmit-receive means, and an intermediate frequency receiver responsively coupled to said mixer, the combination comprising:

- A spacing frequency oscillator for providing a frequency equal to an integer submultiple of the IF frequency of said receiver, and
- Closed loop radio-frequency single side band modulation means having one input coupled to said radio frequency source and a second input coupled to said spacing frequency oscillator for providing an upper side band output and a lower side band output, one of said outputs being combined with said radio frequency input thereto, a first one of said side band outputs being coupled as an input to said pulse modulator and a second one of said side band outputs being coupled as a local oscillator input to said receiver mixer.

6. In a pulsed radar system including a source of radio frequency energy and having enhanced small target response and including means for concomitantly transmitting pulsed energy at a plurality of mutually coherent, discrete frequencies uniformly spaced apart in frequency, the combination comprising

- Means for generating a reference modulating frequency at least as high as the reciprocal of the pulsewidth of said pulsed energy and representing an integer submultiple of a preselected intermediate frequency;
- Radio frequency single side band modulator means coupled to said first mentioned means and adapted to be coupled to said source of radio frequency energy for providing an upper and a lower side band signal; and
- Magic-tee radio frequency signal combining means for combining one of said side band signals and said radio-frequency energy as a combined input to said single side band means and as a further input to said pulsed energy transmitting means.

7. A pulsed radar system comprising

- A source of a modulating frequency at least as high as that represented by the reciprocal of the pulsewidth provided by said pulsed radar system;
- Closed loop radio frequency single side band modulating means responsive to said modulating frequency for generating an upper side band signal and a lower side band signal, each representing more than two mutually coherent, concomitant and discrete frequencies, uniformly spaced apart in frequency by said modulating frequency, one of said side band signals being pulse modulated for transmission by said pulsed radar system; and
- Intermediate frequency receiving means having a first input responsive to received echoes of said transmitted signals and a local oscillator input responsive to the other of said side band signals for providing an output signal at an intermediate frequency equal to twice said modulating frequency.

8. The device of claim 7 in which said closed loop single side band modulating means is comprised of

- A magic tee having a first input coupled to a source of radio frequency energy;
- First and second balanced modulators;
- Radio frequency power splitting means coupling a first input of each of said balanced modulators to an output of said magic tee, a second input of said modulators being responsively coupled to the output of said modulating frequency source;
- A quadrature phase-shifter interposed between the output of said modulating frequency source and the second input to one of said balanced modulators; and
- A three-decibel sidewall coupler having a first and second input coupled to a respective output of said first and second balance modulator for providing an upper side band signal at a first output thereof and a lower side band signal at a second output thereof, one of said outputs of said coupler being coupled to a second input of said magic tee.

9. In a pulsed radar system having enhanced small target response and including means for transmitting pulsed energy at a concomitant plurality of mutually-coherent, discrete frequencies uniformly spaced apart in frequency and receiving means responsive to received echoes of said pulsed energy reflected from a target, the combination comprising

- Means for generating a reference modulating frequency at least as high as the reciprocal of the pulsewidth of said pulsed energy and representing an integer submultiple of a preselected intermediate frequency;
- Radio frequency single side band modulator means coupled to said first mentioned means and adapted to be coupled to a source of radio frequency energy for providing a side band signal;
- Magic tee radio frequency signal combining means for combining said side band signal as a feedback signal with a radio-frequency input to said single side band means and to said pulsed energy transmitting means; and
- Noncoherent intermediate frequency receive means including mixer means responsive to said received echoes for reducing said received echoes to said preselected intermediate frequency.

10. In a pulsed radar system, pulsed means for transmitting a concomitant plurality of mutually-coherent discrete frequencies uniformly spaced apart in frequency and receiving means responsive to that beat frequency of the combined spectra of received echoes of said pulsed energy corresponding to an integer multiple of said uniform frequency spacing, said transmitting means comprising in combination

- A source of radio frequency energy-to-be-modulated;
- A source of a modulating frequency at least as high as that represented by the reciprocal of the pulsewidth of said pulsed energy and corresponding to an integer submultiple of a preselected intermediate frequency;
- Radio frequency single side band modulation means responsively coupled to said modulating source and said source of radio frequency energy-to-be-modulated for providing upper side band and lower side band signals; and
- Radio frequency combining means for combining one of said upper side band and lower side band signals with the radio-frequency input to both said single side band modulation means and said pulsed transmitting means.

11. The device of claim 10 in which there is further provided noncoherent receiving means comprising A receiver mixer having a first input responsive to said received echoes and a local oscillator input responsive to the other of said upper and lower side band signals for providing intermediate frequency receiver signals; and Tuned intermediate frequency signal translating means having a bandpass at least as large as the reciprocal of said transmitted pulsewidth and a center frequency equal to an integer multiple of said modulating frequency.

12. In a pulsed radar system, pulsed means for transmitting a concomitant plurality of discrete frequencies uniformly spaced apart in frequency and receiving means responsive to that beat frequency of the combined spectra of received echoes of said pulsed energy corresponding to an integer multiple of said uniform frequency spacing, comprising in combination A source of radio frequency energy-to-be-modulated;

A pulse modulator responsively coupled to said radio frequency source;

A source of a modulating frequency at least as high as that represented by the reciprocal of the pulsewidth of said pulsed energy and corresponding to an integer sub-multiple of a preselected intermediate frequency;

Radio frequency single side band modulation means responsively coupled to said modulating source and said source of radio frequency energy-to-be-modulated for providing upper side band and lower side band signals;

Radio-frequency combining means for combining one of said upper side band and lower side band signals with the radio-frequency input to both said single side band modulation means and said pulse modulator; and Noncoherent intermediate receiving means including mixer means responsive to said received echoes and the other of said side band signals for side band signals for reducing said received echoes to beat frequencies corresponding to said preselected intermediate frequency.

13. In a pulsed radar system having enhanced small target response and including means for transmitting pulsed energy at a concomitant plurality of discrete frequencies uniformly spaced apart in frequency and receiving means responsive to received echoes of said pulsed energy reflected from a target, the combination comprising A source of a reference modulating frequency at least as high as the reciprocal of the pulsewidth of said pulsed energy and representing a preselected intermediate frequency;

Radio frequency single side band modulator mixing means coupled to said first mentioned means and adapted to be coupled to a source of radio frequency energy for providing side band signals;

Band pass limited means responsive to one of said side band signals for providing a feedback signal;

Magic tee radio frequency signal combining means for combining said feedback signal with the radio-frequency input to said single side band means;

Diode microwave mixer means responsive to said received echoes of uniformly-spaced discrete frequencies for reducing said received echoes to said preselected intermediate frequency; and Tuned intermediate frequency means responsive to said intermediate frequency echoes of said preselected frequency.

14. In a pulsed radar system having enhanced small target response and including means for transmitting pulsed energy at a concomitant plurality of discrete frequencies uniformly spaced apart in frequency and receiving means responsive to received echoes of said pulsed energy reflected from a target, the combination comprising A source of a reference modulating frequency at least as high as the reciprocal of the pulsewidth of said pulsed energy and representing a preselected intermediate frequency;

Radio frequency single side band modulator mixing means coupled to said first mentioned means and adapted to be coupled to a source of radio frequency energy for providing a upper and lower side band signal;

First band pass limited means responsive to one of said upper side band and lower side band signals for providing a feedback signal;

Magic tee radio frequency signal combining means for combining said feedback signal with the radio-frequency input to said single side band means;

Second band pass limited means responsive to the other of said upper and lower side band signals for providing a receiver local oscillator signal; and Noncoherent intermediate frequency receiver means including mixer means responsive to said received echoes and said local oscillator signal for reducing said received echoes to said preselected intermediate frequency.

15. The device of claim 14 in which the bandpass of said first bandpass limiting means includes said radio frequency as single-sideband modulated by a preselected number of harmonics of said modulating frequency, the bandpass of said second bandpass limiting means includes said radio frequency as single side band modulated by harmonics less the highest one of the modulating frequency included in said feedback signal; and in which said intermediate frequency receiver is tuned to an intermediate center frequency equal to an integer number greater than one of said modulating frequency.

16. The device of claim 15 in which the bandpass of said intermediate frequency receiver is limited to the reciprocal of the transmitted pulsewidth of said pulsed energy.

17. The device of claim 14 in which said single side band modulating means is comprised of First and second balanced modulators;

Radio frequency power splitting means coupling a first input of each of said balanced modulators to an output of said magic tee, a second input of each of said modulators being responsively coupled to the output of said modulating frequency source;

A quadrature phase-shifter interposed between the output of said modulating frequency source and the second input to one of said balanced modulators; and A three-decibel sidewall coupler having a first and second input coupled to a respective output of said first and second balanced modulator for providing an upper side band signal at a first output thereof and a lower side band signal at a second output thereof.

* * * * *